Figure 1:
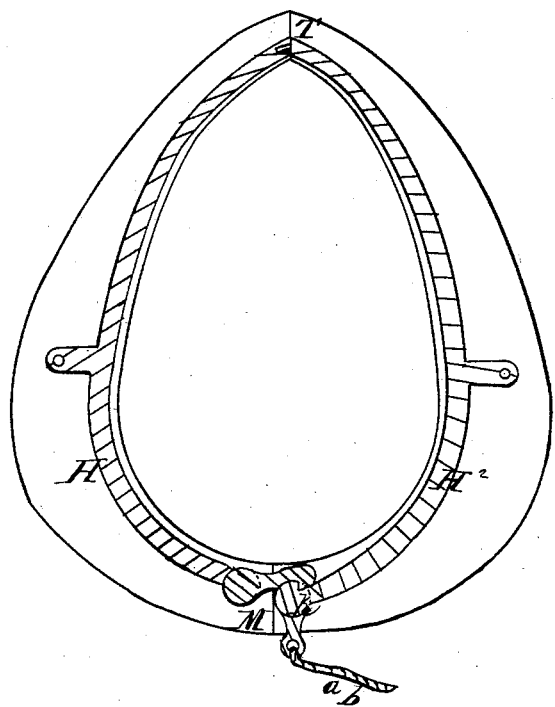

W. S. Wood,
Hames Fastener,
Nº 76,369.  Patented Apr. 7, 1868.

Witnesses:
Isaac R. Oakford
Robert Wilkinson

Inventor:
Wm. S. Wood
per D. Epineuil & Evans
Attorneys

United States Patent Office.

WILLIAM S. WOOD, OF HATBOROUGH, PENNSYLVANIA.

Letters Patent No. 76,369, dated April 7, 1868.

IMPROVEMENTS IN HARNESS.

The Schedule referred to in these Letters Patent and making part of the same.

TO ALL WHOM IT MAY CONCERN:

Be it known that I, WILLIAM S. WOOD, of Hatborough, in the county of Montgomery, in the State of Pennsylvania, have invented a new and useful Improvement in "Harnesses;" and I do hereby declare that the following is a full and exact description of the same, reference being had to the accompanying drawings, making a part of this specification, and in which—

Figure 1 is a perspective of my improved harness, showing the hook and spring connecting the hames of the collar.

The nature of my invention consists in providing a harness so constructed as to render the hitching and unhitching of the horse as simple and easy an operation as possible, and which, by means of a peculiar device, will, at all times, in case of the horse taking fright, for instance, and running away, allow the driver to unhitch the horse without alighting from the carriage.

To enable others skilled in the art to make and use my invention, I will now proceed to describe its construction and operation.

I construct the horse-collar so that it opens at bottom, M, and is flexible or hinged at top, T, the hames being permanently connected with the collar. A rope or strap, $a\ b$, is fastened on a spring-hook, $k$, which acts on the hames H H', so as to connect or disconnect them at will by means of the said rope or strap $a\ b$, the ends of which are in the hands of the driver, or within his reach. If we suppose the horse running away, by fright or otherwise, the driver, without moving or alighting from his seat, gives a pull to rope or strap $a\ b$, opens the collar, and the horse, thus made free, runs away, leaving the carriage and driver in safety behind him.

Having thus described my invention, what I claim as my invention, and desire to secure by Letters Patent of the United States, is—

A harness composed of open collar, with permanent hames H H', rope or strap $a\ b$, spring-hook $k$, all combined and constructed and operating in the manner and for the purpose above set forth and described.

WILLIAM S. WOOD.

Witnesses:
LIONEL D'EPINEUIL,
CHARLES E. EVANS,
SAMUEL L. TAYLOR.